United States Patent
Wienand et al.

(10) Patent No.: US 8,730,002 B2
(45) Date of Patent: May 20, 2014

(54) NON-CONDUCTING ZIRCONIUM DIOXIDE

(75) Inventors: Karlheinz Wienand, Aschaffenburg (DE); Matsvei Zinkevich, Goldbach (DE)

(73) Assignee: Heraeus Sensor Technology GmbH, Hanau (DE)

( * ) Notice: Subject to any disclaimer, the term of this patent is extended or adjusted under 35 U.S.C. 154(b) by 326 days.

(21) Appl. No.: 13/146,529

(22) PCT Filed: Jan. 20, 2010

(86) PCT No.: PCT/EP2010/000307
§ 371 (c)(1), (2), (4) Date: Jul. 27, 2011

(87) PCT Pub. No.: WO2010/089024
PCT Pub. Date: Aug. 12, 2010

(65) Prior Publication Data
US 2011/0305259 A1    Dec. 15, 2011

(30) Foreign Application Priority Data
Feb. 6, 2009   (DE) .......................... 10 2009 007 940

(51) Int. Cl.
*H01C 7/02* (2006.01)
*H01C 7/04* (2006.01)
*H01C 7/06* (2006.01)
*H01C 7/00* (2006.01)
*G01K 7/18* (2006.01)

(52) U.S. Cl.
CPC .. *H01C 7/02* (2013.01); *H01C 7/06* (2013.01); *H01C 7/008* (2013.01); *G01K 7/183* (2013.01); *G01K 2205/04* (2013.01)
USPC .............................................. 338/25; 338/13

(58) Field of Classification Search
CPC ............. H01H 7/00; H01H 7/02; H01H 7/06; H01H 7/008; H01H 8/00; G01K 7/183; G01K 2205/04
USPC ...................... 338/25, 20, 13, 22 R
See application file for complete search history.

(56) References Cited

U.S. PATENT DOCUMENTS 5,366,766 A   11/1994   Sekiguchi et al.
5,831,512 A   11/1998   Wienand et al.
(Continued)

FOREIGN PATENT DOCUMENTS

DE   19540194 C1   2/1997
DE   10210772 C1   6/2003
(Continued)

OTHER PUBLICATIONS

Machine translation of EP 0909950 dated Apr. 21, 1999.*
(Continued)

*Primary Examiner* — Kyung Lee
(74) *Attorney, Agent, or Firm* — Panitch Schwarze Belisario & Nadel LLP

(57) ABSTRACT

A resistance thermometer is provided having a measuring resistor in a form of a 0.1 to 10 μm thick structured platinum layer applied to an electrically insulated surface of a substrate and an electrically insulating coating layer covering the platinum layer. The substrate or its surface contains zirconium dioxide, which is stabilized with oxides of a trivalent and a pentavalent metal. Preferably, the trivalent metal is yttrium and the pentavalent metal is tantalum or niobium. The characteristic curve of the measuring resistor preferably conforms to DIN-IEC 751. For mass production of resistance thermometers having high and reproducible measurement accuracy, a structured platinum layer having a thickness of 0.1 to 10 μm is applied to an electrically insulating substrate having a thermal expansion coefficient in the range of 8.5 to $10.5 \times 10^{-6}$/° K and a roughness less than 1 μm, and the structured platinum layer is covered by an electrical insulator. The resistance thermometers allow precise temperature measurement between −200° C. and +850° C., preferably as a sensor in an exhaust gas treatment system. In a substance-sensitive sensor having a circuit path structure on a substrate, the circuit path structure has an epitaxially applied base layer, and a substance-sensitive metal layer attached to the epitaxially applied base layer.

9 Claims, 1 Drawing Sheet

(56) References Cited

U.S. PATENT DOCUMENTS

| | | | |
|---|---|---|---|
| 5,896,081 A * | 4/1999 | Tzeng et al. | 338/22 R |
| 6,819,217 B2 | 11/2004 | Wienand et al. | |
| 7,339,455 B2 * | 3/2008 | Fujita et al. | 338/25 |
| 8,106,740 B2 * | 1/2012 | Holoubek | 338/22 R |
| 8,183,974 B2 * | 5/2012 | Wienand et al. | 338/25 |
| 2010/0117784 A1 | 5/2010 | Holoubek | |

FOREIGN PATENT DOCUMENTS

| | | |
|---|---|---|
| DE | 102006012088 A1 | 9/2007 |
| DE | 102007023434 A1 | 11/2008 |
| EP | 0488503 A2 | 6/1992 |
| EP | 0909950 A2 | 4/1999 |
| JP | S61-138486 A | 6/1986 |
| JP | H02-58304 A | 2/1990 |
| JP | H02-168664 A | 6/1990 |

OTHER PUBLICATIONS

Int'l Search Report issued Oct. 7, 2010 in Int'l Application No. PCT/EP2010/000307; Written Opinion.

Kim, "Effect of $Ta_2O_5$, $Nb_2O_5$, and $HfO_2$ Alloying on the Transformability of $Y_2O_3$-Stabilized Tetragonal $ZrO_2$", Journal of the American Ceramic Society, vol. 73, No. 1, pp. 115-120 (1990).

Raghavan et al, "$Ta_2O_5/Nb_2O_5$ and $Y_2O_3$ Co-doped Zirconias for Thermal Barrier Coatings", Journal of the American Ceramic Society, vol. 87, No. 3, pp. 431-437 (2004).

Fergus, "Doping and defect association in oxides for use in oxygen sensors", Journal of Materials Science, vol. 38, pp. 4259-4270 (2003).

Skelton et al, "A surface-science-based model for the selectivity of platinum-gold alloy electrodes in zirconia-based NOx sensors", Sensors and Actuators, vol. 96, pp. 46-52 (2003).

German translation of an Office Action issued Jun. 24, 2013 in JP Application No. 2011-548568.

* cited by examiner

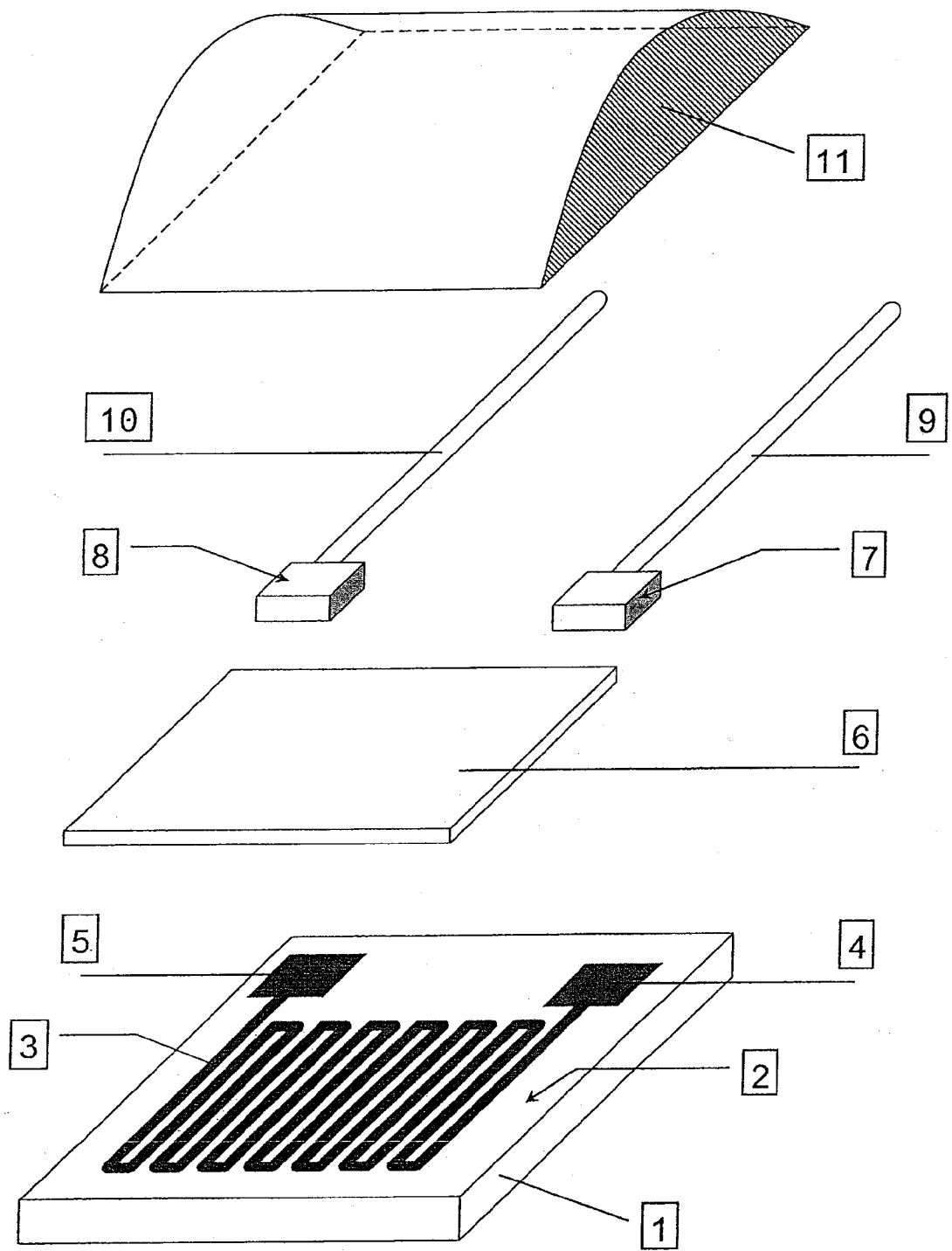

NON-CONDUCTING ZIRCONIUM DIOXIDE

CROSS-REFERENCE TO RELATED APPLICATIONS

This application is a Section 371 of International Application No. PCT/EP2010/000307, filed Jan. 20, 2010, which was published in the German language on Aug. 12, 2010, under International Publication No. WO 2010/089024 A2 and the disclosure of which is incorporated herein by reference.

BACKGROUND OF THE INVENTION

The invention relates to a resistance thermometer having a measuring resistor in the form of a resistance layer consisting essentially of a metal of the platinum group in a thickness of 0.1 to 10 µm, which is deposited on an electrically insulating surface of a carrier having a thermal expansion coefficient in the range of 8.5 to $10.5 \times 10^{-6}/°$ K and is provided with an electrically insulating cover layer.

German Patent DE 195 40 194 C1 discloses a resistance thermometer in which the substrate consists of magnesium titanate. The thermal expansion coefficient of magnesium titanate lies in the range of platinum. In this way, stresses are dissipated and the dimensional accuracy is improved relative to substrates made of aluminum oxide. For this purpose, however, it must be taken into account that magnesium titanate has an open-pore structure and a low fracture strength.

BRIEF SUMMARY OF THE INVENTION

The object of the present invention is to achieve improved reproducibility and improved yield in production while maintaining long-term stability above 500° C.

For achieving the object, a resistance layer made of platinum is deposited on a zirconium dioxide substrate, which is stabilized with a trivalent metal and a pentavalent metal, for example with yttrium and tantalum.

According to the invention, the generation of more exact and more reproducible structures is made possible. Accompanying this, more exact and more reproducible measurements are made possible. These advantages benefit, in particular, finer structures. In this connection, finer structures can be constructed relative to substrates based on magnesium titanate.

The high reproducibility and accuracy are made possible by a smooth surface of the substrate. To this end, the structure of the substrate preferably has grains with an average grain size below 1.5 µm. For zirconium dioxide, typically stabilized with yttrium, as the substrate oxygen conductivity is suppressed by the addition of tantalum or niobium. Instead of yttrium, other divalent metals or trivalent metals, for example scandium, could also be used for stabilization. The high fracture strength is achieved by a content of 20-40 mol.% stabilizer, with respect to the total metal content, preferably 25-35 mol.%, because the high-temperature tetragonal phases of the zirconium dioxide are maintained. The mechanical strength is also increased to above 250 MPa by doping with $HfO_2$.

In particular, with respect to a platinum measuring resistor, the characteristic curve for platinum according to DIN IEC 751 is reproduced.

Preferably, the measuring resistor is protected by a cover, preferably made of glass or a ceramic plate fastened with glass solder, advantageously made of the same material as the substrate.

It is very useful that a measurement element according to the invention reproduces the DIN-IEC characteristic curve in the range of −200° C. to 850° C. In particular, a high dwell time can be achieved for a temperature load above 500° C.

An electrically insulating, stabilized zirconium dioxide at temperatures above 500° C. has at least two metal oxides, which have a valence different from the valence of 4 and which balance out, on average, to a valence of 4, in particular equimolar quantities of trivalent and pentavalent metal oxides, preferably yttrium, scandium, or lanthanum, or lanthanide and niobium or tantalum. Further suitable as divalent metal oxides are calcium oxide, strontium oxide, barium oxide, and magnesium oxide, as well as hexavalent metal oxides molybdenum trioxide and tungsten trioxide. Additives suitable for improving the mechanical substrate properties are, in particular, nanopowders of hafnium dioxide or aluminum oxide, in particular ATZ (alumina toughened zirconia) containing 10 to 40 wt.% aluminum oxide. ATZ substrates made of mixtures of the stabilized zirconium dioxide and aluminum oxide exhibit an especially high temperature shock resistance.

The suitability for mass production with high measurement accuracy, according to the invention, with excellent reproducibility between 300° C. and 1000° C., in particular above 500° C., suggests itself to applications in exhaust-gas treatment, especially for high temperature shock resistance. In the application range between 300° C. and 700° C., there is outstanding long-term stability.

A substance-sensitive sensor is also provided, which has a strip-conductor structure on a substrate, wherein according to the invention the strip-conductor structure has an epitaxially deposited base layer and a substance-sensitive metal layer affixed to the epitaxially deposited base layer.

In particular,
the base layer is an epitaxially deposited platinum or iridium layer;
the substrate is a sapphire;
the sensitive metal is selected from the group of gold, silver, copper, nickel, palladium, platinum, iridium, ruthenium, cobalt, iron, rhenium, and manganese;
the sensitive layer is below 8 nm, preferably below 5 nm, thick (optimally it would be one atom layer thick).

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is an exploded, schematic, perspective view illustrating the layers and elements of a measuring resistor according to an embodiment of the invention.

DETAILED DESCRIPTION OF THE INVENTION

Embodiment 1

FIG. 1 shows a measuring resistor, in which the resistance layer 3 is deposited directly on the surface 2 of an electrically insulating substrate 1. As the substrate 1, a block-shaped body made of yttrium and tantalum-stabilized zirconium dioxide (ZYTa) is used. For the complete stabilization of the zirconium dioxide, 16 mol % Y and 16 mol.% Ta are added. The production of the substrate 1 is performed by foil casting with subsequent sintering at 1500° C. As a result, 97% of the theoretical density and a fracture strength of 260 MPa are achieved, so that substrate fracture in the production process of the measuring resistor according to FIG. 1 is practically excluded. The thermal expansion coefficient of the substrate 1 lies in the range of 9.0 to $11.0 \times 10^{-6}$/° K.

On the surface 2 of the substrate 1 the resistance layer 3 made of a platinum-group metal, preferably platinum, is deposited by sputtering. The resistance layer 3 preferably has the shape of a meander. The surface 2 is free of pores and has a low roughness of <1 µm. In this way, a very fine structuring is made possible. In one advantageous construction of the Pt1000 measuring resistor (rated value 1000Ω at 0° C.), platinum strip conductors are 5 µm wide. In addition, a high reproducibility with a standard deviation of 0.02% of the rated value is achieved in series production.

The relatively sensitive and catalytically active platinum resistance layer 3 is protected by a passivation layer 6. When the passivation layer 6 is deposited, the associated contact area is exposed in the area of the contacts 4, 5, i.e., not covered by the passivation layer 6. The passivation layer 6 is made of one or more layers of borosilicate glass having a total thickness of 10 to 100 µm and is preferably deposited by screen-printing technology.

The contacts 4, 5 of the resistance layer 3 are connected via contact surfaces 7, 8 to outer contact lines 9, 10, preferably by thermocompression bonding. The contact area is electrically insulated and released from stress by an outer cover layer 11, deposited on the contact surfaces 7, 8 and on the passivation layer 6 and made of a glass ceramic material in a thickness of 0.1 to 5 mm.

Embodiment 2

A sapphire substrate having a 5 nm-thick platinum layer is coated with 2 nm gold. In this layer thickness, gold is no longer a homogeneous layer, but instead is coated inhomogeneously on the platinum layer with a theoretical average layer thickness of 2 nm. The gold layer is the deciding factor for the conductivity and thus also the surroundings of the gold layer. This gold layer features especially high sensitivity with respect to organic molecules on its side opposite the platinum layer. In one preferred construction, another layer is deposited on the gold layer, in particular made of organic molecules, which improves the sensitivity due to interaction with other substances. In this way, on the one hand, the sensitivity of certain substances increases and, on the other hand, the spectrum of substances that can be measured with sensitivity increases. For example, with a thiourea layer, the pH sensitivity of the sensor is increased.

In another preferred construction the competing reaction of different adsorbates on the gold surface is utilized, such that the change in conductivity for the coating with a substance, for example cysteine, is also dependent on how much of a coating by competing adsorbates is already present. In particular, this latter technique allows, in addition to the qualitative determination, also an especially good quantitative determination.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A resistance thermometer comprising a measuring resistor having a form of a 0.1 to 10 µm thick structured platinum layer deposited on an electrically insulating surface of a substrate and an electrically insulating cover layer for the platinum layer, wherein the substrate or its surface contains zirconium dioxide stabilized with 20 to 40 mol % of a stabilizer comprising an oxide of a trivalent metal and an oxide of a pentavalent metal, wherein the trivalent metal is yttrium and wherein the pentavalent metal is tantalum or niobium, and wherein the substrate exhibits a high fracture strength.

2. The resistance thermometer according to claim 1, wherein a characteristic curve of the measuring resistor satisfies DIN-IEC 751.

3. The resistance thermometer according to claim 1, which is capable of temperature measurements above 500° C.

4. The resistance thermometer according to claim 3, wherein the thermometer is a sensor of an exhaust-gas treatment system.

5. A method for mass production of resistance thermometers having high and reproducible measurement accuracy, the method comprising depositing a structured 0.1 to 10 µm thick platinum layer on an electrically insulating substrate having a thermal expansion coefficient in a range of 8.5 to $10.5 \times 10^{-6}$/° K and a roughness under 1 µm, and covering the structured platinum layer in an electrically insulating way, wherein the substrate or its surface contains zirconium dioxide stabilized with 20 to 40 mol % of a stabilizer stabilized with an oxide of a trivalent metal and an oxide of a pentavalent metal, wherein the trivalent metal is yttrium and the pentavalent metal is tantalum or niobium, and wherein the substrate exhibits a high fracture strength.

6. The resistance thermometer according to claim 1, wherein the content of stabilizer is about 25 to 35 mol %.

7. The resistance thermometer according to claim 1, wherein the stabilizer comprises 16 mol % yttrium and 16 mol % tantalum.

8. The method according to claim 5, wherein the content of stabilizer is about 25 to 35 mol %.

9. The method according to claim 5, wherein the stabilizer comprises 16 mol % yttrium and 16 mol % tantalum.

* * * * *